July 24, 1962 R. N. ROBERTS 3,046,059
SOLIDS HANDLING DEVICES
Filed May 5, 1960

INVENTOR
Royal N. Roberts

United States Patent Office 3,046,059
Patented July 24, 1962

3,046,059
SOLIDS HANDLING DEVICES
Royal N. Roberts, Media, Pa., assignor to Goyne Pump Company, a corporation of Pennsylvania
Filed May 5, 1960, Ser. No. 27,042
9 Claims. (Cl. 302—14)

This invention relates to solids handling devices and particularly to a device for handling precipitated solids in a liquid system.

Many industrial processes in common use involve the suspension of heavy solid material, in liquid carriers. For example, in the heavy media system for the separation of coal, it is the practice to use as the flotation agent a suspension of magnetite in water. However, all of such systems are faced with a common problem of re-suspending the solids in the liquid vehicle when the system is accidentally or purposely shut down. So long as the system is operating the flow of suspension will maintain the solids in suspension, but when flow ceases, the solids immediately begin to precipitate. If flow is discontinued for any length of time, the precipitated solids in the bottoms of collecting tanks, treating vessels and the like becomes so heavy that conventional pumping mechanisms are unable to begin circulation from the bottom of such vessels. As a result, external means must be used to agitate and resuspend the heavy particles, or liquid must be pumped through the top of such vessels in an effort to create sufficient agitation to again suspend the particles.

I have invented a solids handling device which makes it possible to immediately begin the resuspension of precipitated solids from the bottom of the vessel in which precipitation has occurred and to use the moving suspended solids in the recirculating system to aid in further suspending the remaining precipitated solids.

In a preferred embodiment of my invention, I provide a sump into which solids containing liquids are received for recirculation, liquid delivery means in said sump extending vertically from a point adjacent the top of said sump, and below the level of liquid therein to a point spaced from the bottom thereof, a frusto-conical hood on the bottom of said liquid delivery means spaced from the bottom of the sump, and having a slope such that precipitating solids do not reach the bottom end of the liquid delivery means pump means, a connection from the bottom of the liquid delivery means to the suction side of said pump means and inlet means on the liquid delivery means at a level above the highest level of precipitated solids and in the area of supernatant liquid whereby said supernatant enters the liquid delivery means and the area within the frusto-conical hood. Preferably a primary line from the supernatant liquid to the suction side of the pump is also provided in order that the pump may be primed when it is desired to begin operation. A return line into the sump is also provided in a preferred form of my invention so that the returning suspension aids in resuspension of precipitated solids by agitating the material in the sump.

In the foregoing general description, I have set out certain objects, purposes and advantages of my invention. Other purposes, objects, and advantages will be evident from a consideration of the following description and the accompanying drawings in which.

Figure 1:
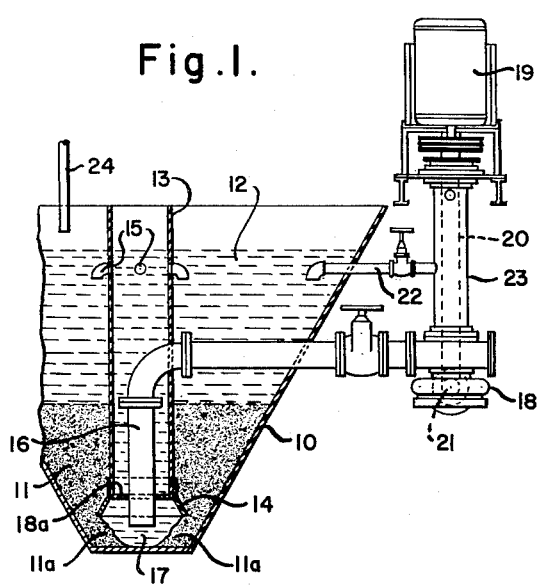
FIGURE 1 is a segmental side elevation, partly in section of a solids handling device according to my invention.
Figure 2:
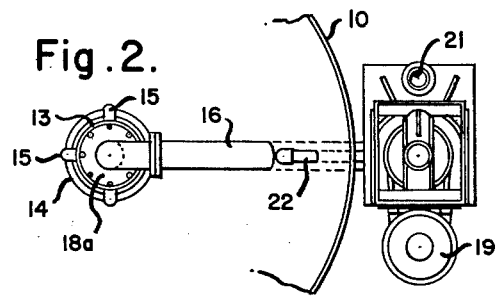
FIGURE 2 is a segmental top plan view of the device of FIGURE 1.

Referring to the drawing and specifically to FIGURES 1 and 2, I have illustrated a sump 10 into which liquid carrying solids is delivered. When the suspension is permitted to stand it settles to form a precipitate 11 and a supernatant 12. A cylindrical housing 13 extends vertically in the sump 10 from a point adjacent its top to a point adjacent the bottom of the sump 10. A frusto-conical hood or bell 14 is fixed to the bottom of cylinder 13 and spaced from the bottom of the sump. The hood 14 causes the precipitated solids 11 to assume an angle of repose such as shown at 11a beneath hood 14. Vents 15 are formed in the cylinder 13 adjacent its top and communicating with the supernatant liquid 12. A suction line 16 is provided axially of cylinder 13 and communicating with the area 17 beneath hood 14. A perforated plate 18a is preferably fixed about the line 16 at the end of housing cylinder 13 to provide restricted flow of liquid from the interior of cylinder 13 into area 17. A pump 18 is connected to the suction line 16. The pump 18 is driven by a motor 19 through vertical shaft 20. A delivery line 21 from the pump 18 carries the suspension away from the pump. Preferably a priming line 22 is connected to the inlet on suction side of pump 18 through a hollow housing 23, through which shaft 20 passes on its way to the pump rotor.

When a suspension has been permitted to stand in sump 10 it separates into two fractions, the precipitate 11 and supernatant liquid 12. When the pump 18 is started the suction of line 16 draws water from the supernatant 12 into cylinder 13 through vents 15, through the perforated plate 18a creating a differential pressure between area 17 and the precipitate 11. This jetting water agitates the solids 11a and together with the differential pressure acts on the solids and carries them into line 16 and pump 18. The delivered suspension is forced by pump 18 into delivery line 21 and from thence to the treating system (not shown). The suspension passing through the system may be returned to sump 10 through pipe 24. This returning suspension agitates the material in the sump and aids in accelerating the suspension.

Figure 3:
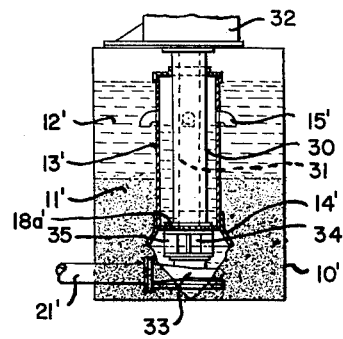
FIGURE 3 is a segmental side elevation, partly in section of a second embodiment of my invention.

In the embodiment shown in FIGURE 3, I have substituted a central hollow axially extending housing 13' for cylinder 13 of FIGURES 1 and 2. The housing 13' carries a drive shaft 31 extending vertically between motor 32 and pump 33 within a housing 30. Inlet openings 34 opening into the area beneath the frusto-conical hood or bell 14' are formed by spaced vanes 35. The remaining parts of the embodiment are identical with those of FIGURES 1 and 2 and are identified by the same numerals bearing a prime sign.

Figure 4:
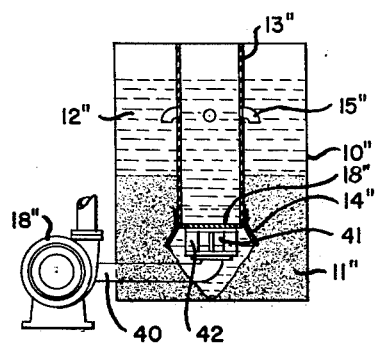
FIGURE 4 is a segmental side elevation partly in section of a third embodiment of my invention.

In the embodiment shown in FIGURE 4, I have substituted a horizontal suction line 40 for the suction line 16 of the embodiment of FIGURES 1 and 2. Suction line 40 is provided with inlet openings 41 formed by spaced vanes 42 in the area beneath bell 14″. The remaining elements are identical with those of FIGURES 1 and 2 and are identified by the same numerals bearing a double prime sign.

Figure 5:
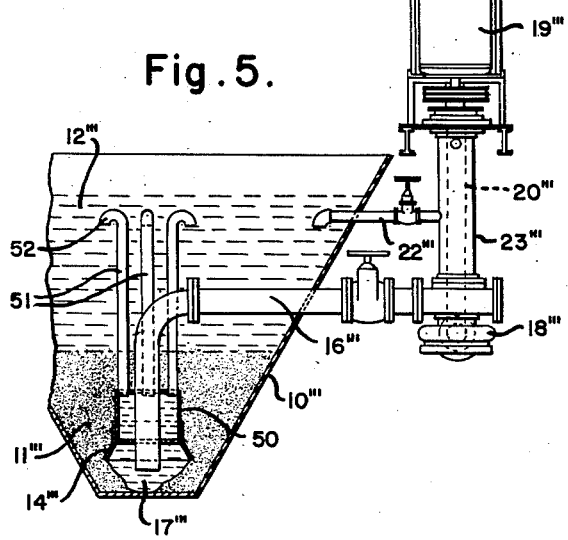
FIGURE 5 is a segmental side elevation partly in section of a fourth embodiment of my invention.

In the embodiment shown in FIGURE 5, I have substituted a manifold 50 with vertical riser pipes 51 and downturned elbows 52 for the cylinder 13 of FIGURES 1 and 2. The remaining elements are identical with those of FIGURES 1 and 2 and are identified by identical numbers bearing a triple prime sign.

The mechanism of this invention may be used for dredging operations or for similar solids lifting and handling applications. In such cases the walls and bottom of the waterway or watercourse form the sump walls which confine the liquid and solid.

While I have illustrated certain preferred embodiments of my invention, it will be understood that this invention may be otherwise embodied within the scope of the following claims.

I claim:

1. A solids handling device comprising a sump into which a slurry of solids in a liquid is received for circulation, which slurry on standing forms precipitated solids and a supernatant liquid, liquid delivery means in said sump extending vertically from a point adjacent the top of said sump to a point spaced from the bottom of said sump, liquid inlet means in said liquid delivery means adjacent the top thereof, and below the normal level of liquid therein, hood means on the bottom of said liquid delivery means extending outwardly and downwardly therefrom, and spaced from the bottom of the sump forming a covered area such that precipitated solids are held away from the bottom end of the liquid delivery means, said liquid delivery means delivering liquid into the hood through a reduced area whereby to create a jetting action, pump means having a suction side and a discharge side, a connection from the bottom of the liquid delivery means to the suction side of said pump means whereby said supernatant liquid enters the liquid delivery means and the area within the hood and is delivered to the suction side of the pump means and discharge means on the discharge side of the pump for carrying away the liquid delivered to the pump through the suction line.

2. A solids handling device comprising a sump into which a slurry of solids in a liquid is received for circulation, which slurry on standing forms precipitated solids and a supernatant liquid, liquid delivery means in said sump extending vertically from a point adjacent the top of said sump to a point spaced from the bottom of said sump, frusto-conical hood means on the bottom of said liquid delivery means extending outwardly and downwardly therefrom, and spaced from the bottom of the sump forming a covered area such that precipitated solids are held away from the bottom end of the liquid delivery means, said liquid delivery means delivering liquid into the hood through a reduced area whereby to create a jetting action, pump means having a suction side and a discharge side, a connection from the bottom of the liquid delivery means to the suction side of said pump means, inlet means on the liquid delivery means at a level above the highest level of precipitated solids and in the area of the supernatant liquid whereby said supernatant liquid enters the liquid delivery means and the area within the hood and is delivered to the suction side of the pump means, and discharge means on the pump for carrying away the liquid delivered to the pump through the suction line.

3. A solids handling device comprising a sump into which a slurry of solids in a liquid is received for circulation, which slurry on standing forms precipitated solids and a supernatant liquid, liquid delivery means in said sump extending vertically from a point adjacent the top of said sump to a point spaced from the bottom of said sump, hood means on the bottom of said liquid delivery means extending outwardly and downwardly therefrom, and spaced from the bottom of the sump forming a covered area such that precipitated solids are held away from the bottom end of the liquid delivery means, said liquid delivery means delivering liquid into the hood through a reduced area whereby to create a jetting action, pump means externally of the sump having inlet and discharge ports, a suction line on said inlet port extending co-axially of and within the liquid delivery to a point within the hood, inlet means on the liquid delivery means at a level above the highest level of precipitated solids and in the area of the supernatant liquid whereby said supernatant liquid enters the liquid delivery means and the area within the hood and discharge means on the pump for carrying away the liquid delivered to the pump through the suction line.

4. A solids handling device comprising a sump into which a slurry of solids in a liquid is received for circulation, which slurry on standing forms precipitated solids and a supernatant liquid, liquid delivery means in said sump extending vertically from a point adjacent the top of said sump to a point spaced from the bottom of said sump, hood means on the bottom of said liquid delivery means extending outwardly and downwardly therefrom, and spaced from the bottom of the sump forming a covered area such that precipitated solids are held away from the bottom end of the liquid delivery means, said liquid delivery means delivering liquid into the hood through a reduced area whereby to create a jetting action, pump means in said hood, having an inlet port open to said covered area, inlet means on the liquid delivery means at a level above the highest level of precipitated solids and in the area of the supernatant liquid whereby said supernatant liquid enters the liquid delivery means and the area within the hood and discharge means on the pump for carrying away the liquid delivered to the pump through the inlet port.

5. A solids handling device comprising a sump into which a slurry of solids in a liquid is received for circulation, which slurry on standing forms precipitated solids and a supernatant liquid, liquid delivery means in said sump extending vertically from a point adjacent the top of said sump to a point spaced from the bottom of said sump, hood means on the bottom of said liquid delivery means extending outwardly and downwardly therefrom, and spaced from the bottom of the sump forming a covered area such that precipitated solids are held away from the bottom end of the liquid delivery means, said liquid delivery means delivering liquid into the hood through a reduced area whereby to create a jetting action, pump means externally of the sump having inlet and discharge ports, a suction line on said inlet port, extending to the bottom of the liquid delivery means, inlet means on the liquid delivery means at a level above the highest level of precipitated solids and in the area of the supernatant liquid whereby said supernatant liquid enters the liquid delivery means and the area within the hood, and discharge means on the pump for carrying away the liquid delivered to the pump through the suction line.

6. A solids handling device comprising liquid delivery means insertable in a sump for handling liquids and slurries which on standing form precipitated solids and a supernatant liquid, said means extending vertically from a point adjacent the top of said sump to a point spaced from the bottom of said sump, hood means on the bottom of said liquid delivery means extending outwardly and downwardly therefrom, and spaced from the bottom of the sump forming a covered area such that precipitated solids are held away from the bottom end of the liquid delivery means, said liquid delivery means delivering liquid into the hood through a reduced area whereby to create a jetting action, pump means having a suction side and a discharge side, a connection from the bottom of the liquid delivery means to the suction side of said pump means and inlet means on the liquid delivery means at a level above the highest level of precipitated solids and in the area of the supernatant liquid whereby said supernatant liquid enters the liquid delivery means and the area within the hood, and discharge means on the pump for carrying away the liquid delivered to the pump through the suction line.

7. A solids handling device comprising a sump into which a slurry of solids in a liquid is received for circulation, which slurry on standing forms precipitated solids and a supernatant liquid, spaced liquid delivery means in said sump extending vertically from a point adjacent the top of said sump below the normal level of liquid therein to a point spaced from the bottom of said sump, manifold means connecting the bottom ends of said delivery means and receiving liquid therefrom, hood means on the bottom of said manifold means extending outwardly and downwardly therefrom, and spaced from the bottom of the sump forming a covered area such that precipitated solids are held away from the bottom end of the manifold means, said liquid delivery means delivering liquids into the hood through a reduced area whereby to create a jetting action, pump means having a suction side and a discharge side, a connection from the bottom of the manifold means to the suction side of said pump means, inlet means on the liquid delivery means at a level above the highest level of precipitated solids and in the area of the supernatant liquid whereby said supernatant liquid enters the liquid delivery means, the manifold and the area within the hood and discharge means on the pump for carrying away the liquid delivered to the pump through the suction line.

8. A solids handling device comprising liquid delivery means insertable into a mass of precipitated solids covered with an area of supernatant liquid vehicle extending vertically from a point above the top of said mass of solids to a point spaced from the top of said solids beneath said solids, hood means on the bottom of said liquid delivery means extending outwardly and downwardly therefrom, within the solids forming a covered area such that precipitated solids are held away from the bottom end of the liquid delivery means, said liquid delivery means delivering liquid into the hood through a reduced area whereby to create a jetting action, pump means having a suction side and a discharge side, a connection from the bottom of the liquid delivery means to the suction side of said pump means and inlet means on the liquid delivery means at a level above the highest level of precipitated solids and in the area of the supernatant liquid whereby said supernatant liquid enters the liquid delivery means and the area within the hood and the suction side of the pump, and discharge means on the pump for carrying away the liquid delivered to the pump through the suction line.

9. A solids handling device comprising liquid delivery means insertable into a mass of precipitated solids covered with an area of supernatant liquid vehicle, extending vertically from a point above the top of said mass of solids to a point spaced from the top of said solids beneath said solids, hood means on the bottom of said liquid delivery means extending outwardly and downwardly therefrom, within the solids forming a covered area such that precipitated solids are held away from the bottom end of the liquid delivery means, said liquid delivery means delivering liquid into the hood through a reduced area whereby to create a jetting action, pump means having a suction side and a discharge side, a connection from the bottom of the liquid delivery means to the suction side of said pump means and inlet means on the liquid delivery means at a level above the highest level of precipitated solids and in the area of the supernatant liquid whereby said supernatant liquid enters the liquid delivery means and the area within the hood and the suction side of the pump, and discharge means on the pump for carrying away the liquid delivered to the pump through the suction line.

References Cited in the file of this patent
UNITED STATES PATENTS

| | | |
|---|---|---|
| 661,609 | Hoover et al. | Nov. 13, 1900 |
| 2,438,258 | Stokes | Mar. 23, 1948 |
| 2,518,811 | Nicholson | Aug. 15, 1950 |
| 2,530,689 | Egger | Nov. 21, 1950 |